A. KESBERGER.
NUT LOCK.
APPLICATION FILED APR. 9, 1910.
974,073.
Patented Oct. 25, 1910.
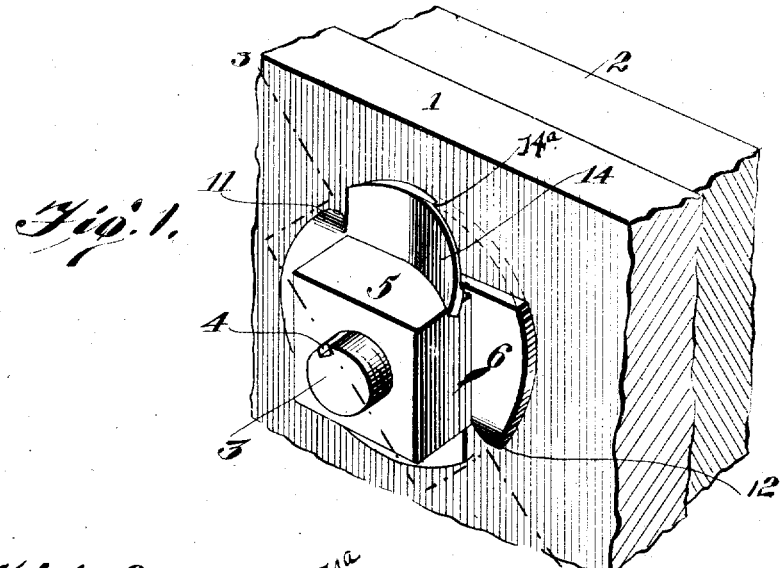
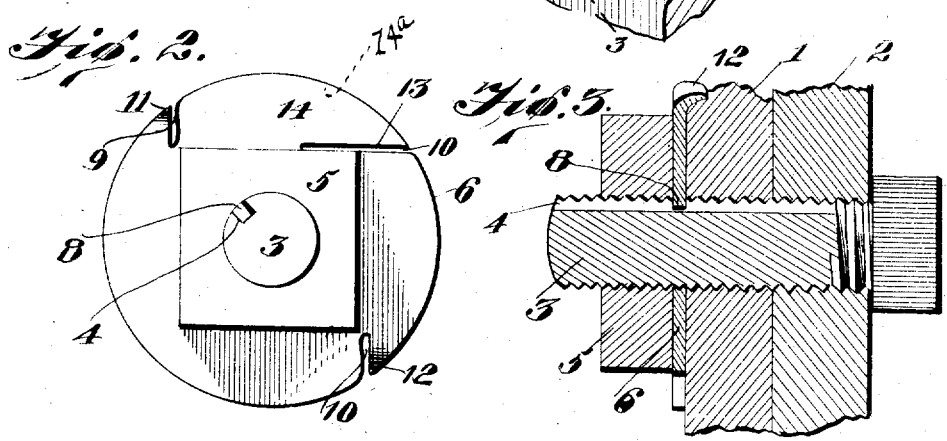
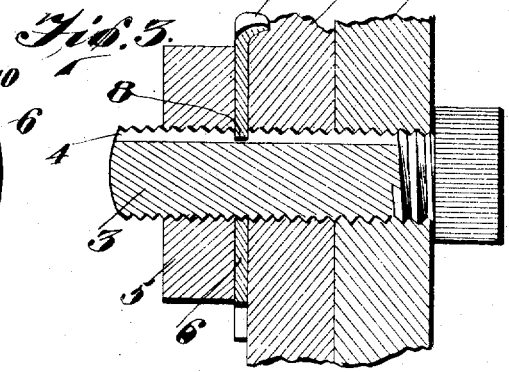
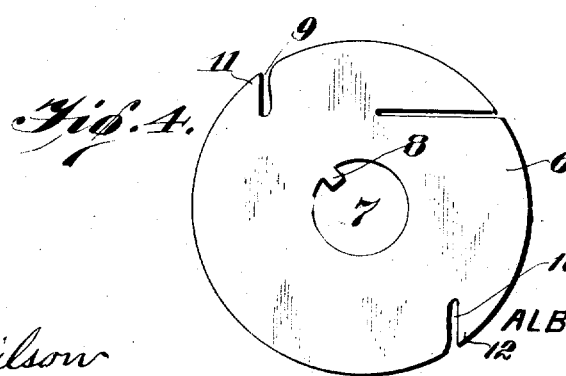
Witnesses
D. C. Wilson
H. Joseph Doyle
Inventor
ALBERT KESBERGER
By E. E. Vrooman,
Attorney.

UNITED STATES PATENT OFFICE.

ALBERT KESBERGER, OF BURDETTE, SOUTH DAKOTA.

NUT-LOCK.

974,073. Specification of Letters Patent. Patented Oct. 25, 1910.

Application filed April 9, 1910. Serial No. 554,544.

*To all whom it may concern:*

Be it known that I, ALBERT KESBERGER, a citizen of the United States of America, residing at Burdette, in the county of Hand and State of South Dakota, have invented certain new and useful Improvements in Nut-Locks, of which the following is a specification, reference being had therein to the accompanying drawing.

This invention relates to nut and bolt locks and the principal object of the same is to provide a washer that is adapted to have a positive engagement with a nut, with a bolt, and with the work held by the nut and bolt, thereby preventing relative movement of said bolt and nut.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a detail perspective view showing the practical application of the invention. Fig. 2 is a front view of a nut and bolt locked together by the improved washer. Fig. 3 is a sectional view taken on the line 3—3, Fig. 1. Fig. 4 is a detail view in front elevation of the washer.

Referring to said drawings by numerals, 1—2 designates the work through which the bolt 3 projects, said bolt having its threaded portion provided with a longitudinal groove 4.

5 designates the nut for the bolt. A washer 6 provided with a central bolt-receiving opening 7 is fitted over said bolt and interposed between the nut 5 and the work. Washer 6 is provided with a lug 8 that projects into opening 7 and enters the groove 4 of bolt 3. Said washer is larger in diameter than the width of the nut 5 and at opposite portions of its periphery is provided with slots 9—10, which forms a pair of oppositely disposed pointed penetrating spurs 11—12 which are bent at right angles to the body of the washer so that they may be forced into the work when the nut 5 is tightened thereon. A third slot 13 is formed in said washer, said slot extending from the periphery of the washer toward the center thereof and being longer than slots 9—10 and projecting in a direction at right angles thereto. Said slot 13 partially detaches a portion from the washer which is bent outward relative to said washer and in a direction opposite to the spurs 11—12 to provide a nut-engaging lip 14.

As will be observed by reference to Figs. 1 and 3, the lug 8 engages the groove 4 of bolt 3 so that relative movement of said bolt and washer is prevented, and that when the spurs 11—12 of washer 6 are forced into the work by nut 4, the washer is locked to the work, after which lip 14 is bent away from the washer so that it will engage one flat side of the nut, thereby preventing reverse movement of the nut.

As is clearly shown in Fig. 1, the locking lip 14 may be reduced in thickness by cutting away, as at 14ª, its undersurface. This provides means whereby a space will be left between said lip and the work when said lip is flattened so that a prying tool may be inserted beneath said lip to force the same to locking engagement with the nut.

What I claim as my invention is:—

1. A nut and bolt lock comprising a washer provided with oppositely disposed parallel inwardly projecting slots which form pointed work-engaging spurs and with an inwardly projecting slot arranged at right angles to the first mentioned slots and forming a nut engaging lip, said washer also provided with bolt-engaging means.

2. A nut and bolt lock comprising a washer provided with work-engaging means, bolt engaging means, and a nut engaging lip, said lip having its under surface cut away to permit a prying tool to be inserted beneath the same.

In testimony whereof I hereunto affix my signature in presence of two witnesses.

ALBERT KESBERGER.

Witnesses:
A. W. HOPKINS,
J. M. ALLEN.